E. R. Stilwell,
Turning Irregular Forms.
Nº 33,313. Patented Sep. 17, 1861.
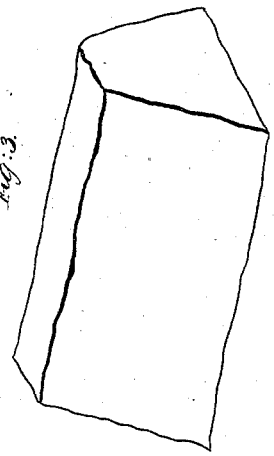
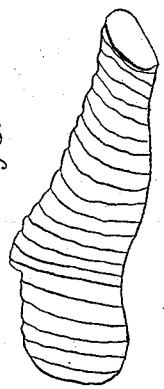
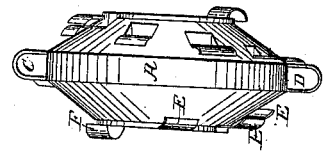
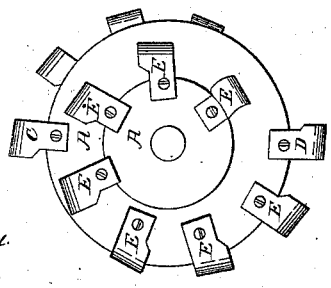
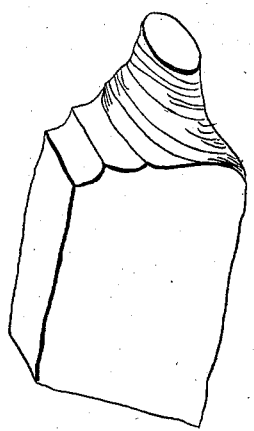
Witnesses:
Chs H Crawford
M L Stilwell
Inventor.
E. R. Stilwell

UNITED STATES PATENT OFFICE.

E. R. STILWELL, OF DAYTON, OHIO.

IMPROVED MACHINE FOR SHAPING LASTS.

Specification forming part of Letters Patent No. 33,313, dated September 17, 1861.

*To all whom it may concern:*

Be it known that I, E. R. STILWELL, of Dayton, in the county of Montgomery and State of Ohio, have invented certain new and useful Improvements in Revolving Cutter-Heads for Roughing Out Lasts; and I do hereby declare that the following is a full and complete description of the construction and operation of the same, reference being had to the accompanying drawings, making a part of this specification, in which—

Figure 1 is a side view of the cutter-head. Fig. 2 is an end view. Fig. 3 represents the block out of which the last is to be made. Fig. 4 is the last partially roughed out by the cutter-head. Fig. 5 represents the last wholly roughed out, and Fig. 6 is a last cut out in the usual way by hand.

The same letters denote like parts in the different views.

The nature of my improvement relates to a revolving cutter-head having cutters arranged on the sides, forming spiral planes from the periphery to the center, that will cut out of a block a last without any previous shaping by hand.

In Figs. 1 and 2, A represents the cutter-head, which is of a circular form, the sides being inclined outward, as shown in Fig. 2. Over the periphery directly opposite are circular blades or cutters C D, the ends of which are screwed to both sides of the head, so that they will be firm and strong. From the blade D toward the center are a number of blades E, curved at the ends and screwed to the side of the cutter-head, forming from the blade D to the blade F a spirally-inclined plane. From the blade C toward the center on the other side are a similar set of blades, so that lasts can be roughed out as the cutter-head moves either way.

Fig. 3 represents the block from which the last is to be formed. It needs no further preparation but to be placed in the machine and moved in the ordinary way, guided by some pattern. The cutter-head is operated by machinery in the usual way.

The manner in which the blades cut their way through the block is shown in Fig. 4. Commencing at either the toe or heel, they cut in an inclined direction, the block advancing and receding according to the pattern until the last is roughed out, as shown in Fig. 5.

Hitherto lasts have had to be blocked out by hand, as shown in Fig. 6. Chopping them out in this way consumes much time and does not get the form as exact as in the method just described, and there is danger, too, of cutting them accidentally, so as to entirely spoil the last, and they are also more liable to check and crack.

When a last is roughed out, as in Fig. 5, it is then finished by the ordinary cutter-head. In this way from a block like that represented by Fig. 3 a last can be made from beginning to end by machinery, which saves any amount of time and does the work more uniformly and thoroughly than it can be done by hand. Each block has to be centered or placed on a stand and a point made on each end to indicate how it is to be placed in the machine; but the same point answers for both machines.

Preparing blocks in the usual way, it is customary to hew off about one-half the timber necessary and then lay the blocks away to dry, which takes from twelve to fifteen months, when they have to be hewed again to remove the unnecessary wood. In this process they are very apt to check and crack; but with this cutter-head lasts can be roughed out the right shape and size that will dry in about eight weeks and be ready for turning in the ordinary way, very little wood having to be removed.

It is found in practical operation that one man attending this machine can rough out more lasts than three to four men can in the usual way.

There are blades on both sides of the cutter-head, in order that it will rough out lasts as it moves laterally either way. The blades are sharpened in the same direction on both sides and so arranged that as the head moves in one direction they will cut from the toe to the heel and as it returns back it will cut from the heel to the toe. It requires much less time to turn a last roughed out in this way than one cut out by hand, for there is so much less wood to be removed, it being nearer the right form.

Instead of the cutter-head being in one solid piece, it can be in two sections or disks, the blades being attached to each disk.

What I claim as my improvement, and desire to secure by Letters Patent, is—

The combination of the cutters with the revolving head when said cutters are arranged in a spiral conical form on said head, converging from the periphery of the head to the center, substantially in the manner and applied to the purpose set forth.

E. R. STILWELL.

Witnesses:
CHR. H. CRAWFORD,
M. L. STILWELL.